UNITED STATES PATENT OFFICE.

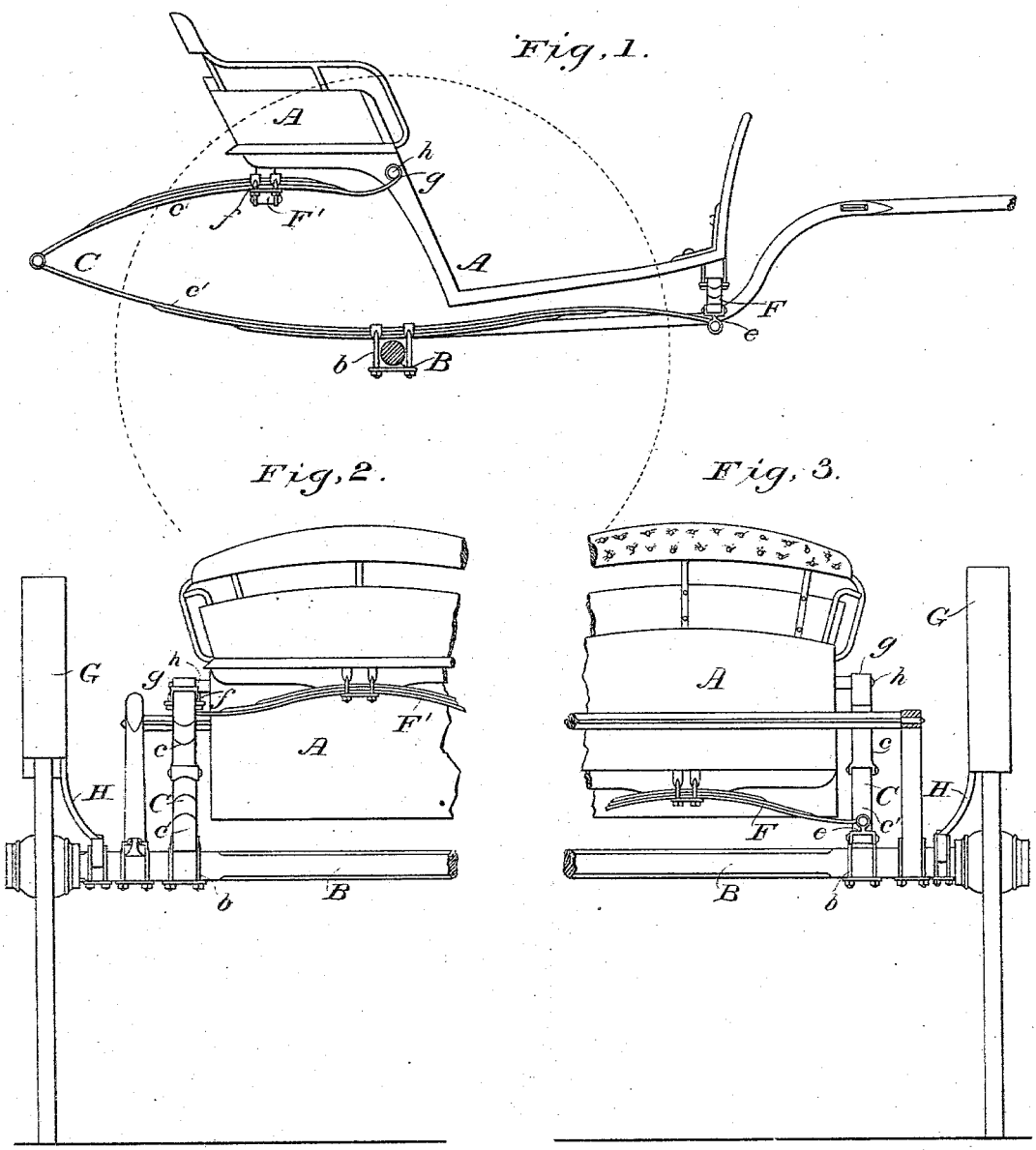

ALBERT P. NELSON, OF PORTLAND, OREGON.

TWO-WHEELED VEHICLE.

SPECIFICATION forming part of Letters Patent No. 288,256, dated November 13, 1883.

Application filed January 27, 1883. (No model.)

*To all whom it may concern:*

Be it known that I, ALBERT P. NELSON, a resident of the city of Portland, in the county of Multnomah and State of Oregon, have invented certain new and useful Improvements in Two-Wheeled Vehicles, of which the following is a specification.

My invention relates to a two-wheeled vehicle in which a body of phaeton shape is suspended between an arrangement of springs, so as to permit the body to vibrate vertically between the springs; and it consists in attaching the body upon two three-quarter elliptic springs, suitably located upon the axle, the lower or half-ellipse extending to the front of the dash, where it is attached by a freely-swinging shackle to a cross-spring, on which the body rests, and the upper or quarter ellipse being secured at its extremity immediately to the body of the vehicle by an eye and bolt, and immediately by a shackle to a cross-spring, on which the rear of the body rests.

In the accompanying drawings, forming part of this specification, Figure 1 is a side elevation of my invention, showing the manner of attaching the spring. Fig. 2 is an end elevation, looking at the back of the vehicle. Fig. 3 is a similar view, looking at front of the vehicle.

A in Fig. 1 represents the body of the vehicle, constructed of phaeton shape. B is the axles. C C are the two side or three-quarter elliptic springs. The upper quarter-ellipse, $c$, is attached to the body by its eye $g$ and the threaded bolt $h$, with shoulder and nut. (See Figs. 1 and 3.) The lower or half ellipse, $c'$, is attached upon the axle B by suitable clips, $b\ b$. F F' are the cross-springs. The front spring, F—that is, the spring attached to the front of body A—is connected with the half-ellipses $c'\ c'$ of side springs, C C, by swinging shackles $e\ e$, and the back cross-spring, F', is attached underneath the back of body A and suspended from the upper or quarter ellipses, $c\ c$, of side springs, C C, by shackles $f\ f$, which are clipped around quarter-ellipses $c\ c$, as shown in Figs. 1 and 3. H H are standards for the support of the mud-fenders G G, and are attached to the axle by suitable clips. These fenders G project above the wheels and on the outside and inside, and will not be pressed down or caused to touch the wheels by the weight of a person getting into or out of the vehicle. Bent shafts are attached to the axle in a well-known way.

The operation of my invention is this: When the occupant is in the seat and the vehicle in motion, the body will move up and down within and between the springs, and the shafts, having no direct connection with the body, but being attached directly to the axle, will, to a very great degree, obviate any jolt being communicated to the occupant from their up-and-down movement when the animal is in motion. The shock will be almost wholly taken up by the springs, owing to the inertia of the vehicle-body. The arrangement of the springs in connection with the swinging shackles gives a springy elastic motion.

I am aware that it is not broadly new to suspend the body of a two-wheeled vehicle upon three-quarter elliptic springs; but

What I claim, and desire to secure by Letters Patent, is—

The combination, in a two-wheeled vehicle, of body A, back cross-spring, F', suspended from the upper quarter-ellipses, $c\ c$, of side spring, C, by shackles $f\ f$, side springs, C C, consisting of quarter-ellipses $c\ c$, terminating in an eye, $g$, attached to body A by the threaded bolt $h$, with shoulder and nut, and part $c'$, attached at the center to axle B, and at the other extremity by freely-swinging shackles to spring F, supporting the front of the wagon, substantially as hereinbefore set forth.

ALBERT P. NELSON.

Witnesses:
C. H. MERYSDORFFER,
C. F. PFLUGER.